United States Patent [19]
Koyama et al.

[11] Patent Number: 5,165,070
[45] Date of Patent: Nov. 17, 1992

[54] SPECIAL EFFECT GENERATOR WITH LIMITED READ ADDRESS CALCULATION REGION

[75] Inventors: Shinsuke Koyama, Chiba; Osamu Watanabe, Tokyo, both of Japan

[73] Assignee: Sony Corporation, Tokyo, Japan

[21] Appl. No.: 556,443

[22] Filed: Jul. 24, 1990

[30] Foreign Application Priority Data

Jul. 25, 1989 [JP] Japan .................................. 1-91875

[51] Int. Cl.$^5$ ........................ H04N 5/262; H04N 9/74
[52] U.S. Cl. ...................................... 358/160; 358/22
[58] Field of Search ............... 358/160, 22, 22 C, 183; 360/33.1; 382/44, 45, 46, 47

[56] References Cited

U.S. PATENT DOCUMENTS

| | | | |
|---|---|---|---|
| 4,774,507 | 9/1988 | Kashigi et al. | 358/22 X |
| 4,875,097 | 10/1989 | Jackson | 358/183 X |
| 4,916,540 | 4/1990 | Kosaka | 358/160 |
| 4,991,014 | 2/1991 | Takahashi et al. | 358/183 |

Primary Examiner—James J. Groody
Assistant Examiner—Mark R. Powell
Attorney, Agent, or Firm—Lewis H. Eslinger; Jay H. Maioli

[57] ABSTRACT

A special effect generator is arranged such that read address calculations for special effect processing of an original video image are limited only to the region within which the processed video image is located on the display screen, so that calculations of read addresses are simplified. The coordinates and image rotation information for several different video special effects are stored in a read-only-memory and are used to limit the address generation operation based on the coordinate boundaries of the image on the video screen, so that only those addresses actually required for the special effect are calculated.

5 Claims, 2 Drawing Sheets

SPECIAL EFFECT GENERATOR WITH LIMITED READ ADDRESS CALCULATION REGION

BACKGROUND OF THE INVENTION

1. Field of Invention

The present invention relates generally to special effect generators for video signals and, more particularly, relates to a video special effect generator of simple arrangement and which can be manufactured inexpensively.

2. Description of the Background

A video special effect generator has been proposed by which an original video image can be rotated, enlarged, shrunk and moved on a picture screen of a television monitor in a three-dimensional (3D) fashion.

In accordance with this previously proposed video special effect generator, an original video image 11 shown on the left-hand side in FIG. 1 is converted into digital data, and stored in a frame memory (not shown). In accordance with processing of the original video image, for example image rotation processing, the read address of the frame memory, that is, the address in the frame memory corresponding to the display address on the display screen is calculated in a real-time fashion, and the original video image data is read out from the frame memory in accordance with the read address resulting from the calculation. Thereafter, the video image data read out from the frame memory is converted into analog form and displayed on the display screen, so that a rotation-processed video image 12 is displayed on a display screen 13 as shown in at the right-hand side in FIG. 1.

In the prior art video special effect generator, in order to display the original video image 11 that is processed to be rotated in a three-dimensional manner, address calculations must be performed to determine the location of coordinates of the display screen 13 relative to the coordinates of the rotation-processed video image.

Thereafter, if the image to be displayed on the display screen 13 involves a portion smaller than the original video image 11, that is, a shrunken image, then the calculation of the coordinates of the location of the rotated image becomes very difficult. For example, assuming that a point α of the original video image 11 represents an origin, then a point β on the display screen 13 is a negative value relative to the processed video image 12, and a point γ on the display screen 13 is a much larger value. Thus, the coordinate system of the whole display screen 13 has a large dynamic range. Therefore, in order to calculate all of the coordinates of the display screen 13 in real time fashion, it is necessary to use a very complicated and expensive calculating circuit.

OBJECTS AND SUMMARY OF THE INVENTION

Accordingly, it is an object of the present invention to provide an improved special effect generator for video signals that can eliminate the aforenoted shortcomings and disadvantages encountered in the prior art.

More specifically, it is an object of the present invention to provide a special effect generator having a simplified circuit arrangement.

It is another object of the present invention to provide a special effect generator that can be manufactured inexpensively.

In accordance with an aspect of the present invention, a special effect generator for video signals is comprised of a memory for storing incoming video signals, a read address generating circuit coupled to the memory for generating a read address to be supplied to the memory and an address generation control circuit coupled to the read address generating circuit for limiting the operation of the read address generating circuit.

These and other objects, features, and advantages of the present invention will be apparent in the following detailed description of a preferred embodiment of the invention to be rad in conjunction with the accompanying drawings, in which like reference numerals are used to identify the same or similar parts in the several views.

DETAILED DESCRIPTION OF THE PREFERRED EMBODIMENT

An embodiment of the special effect generator for video signals according to the present invention will now be described with reference to the drawings.

Figure 2:
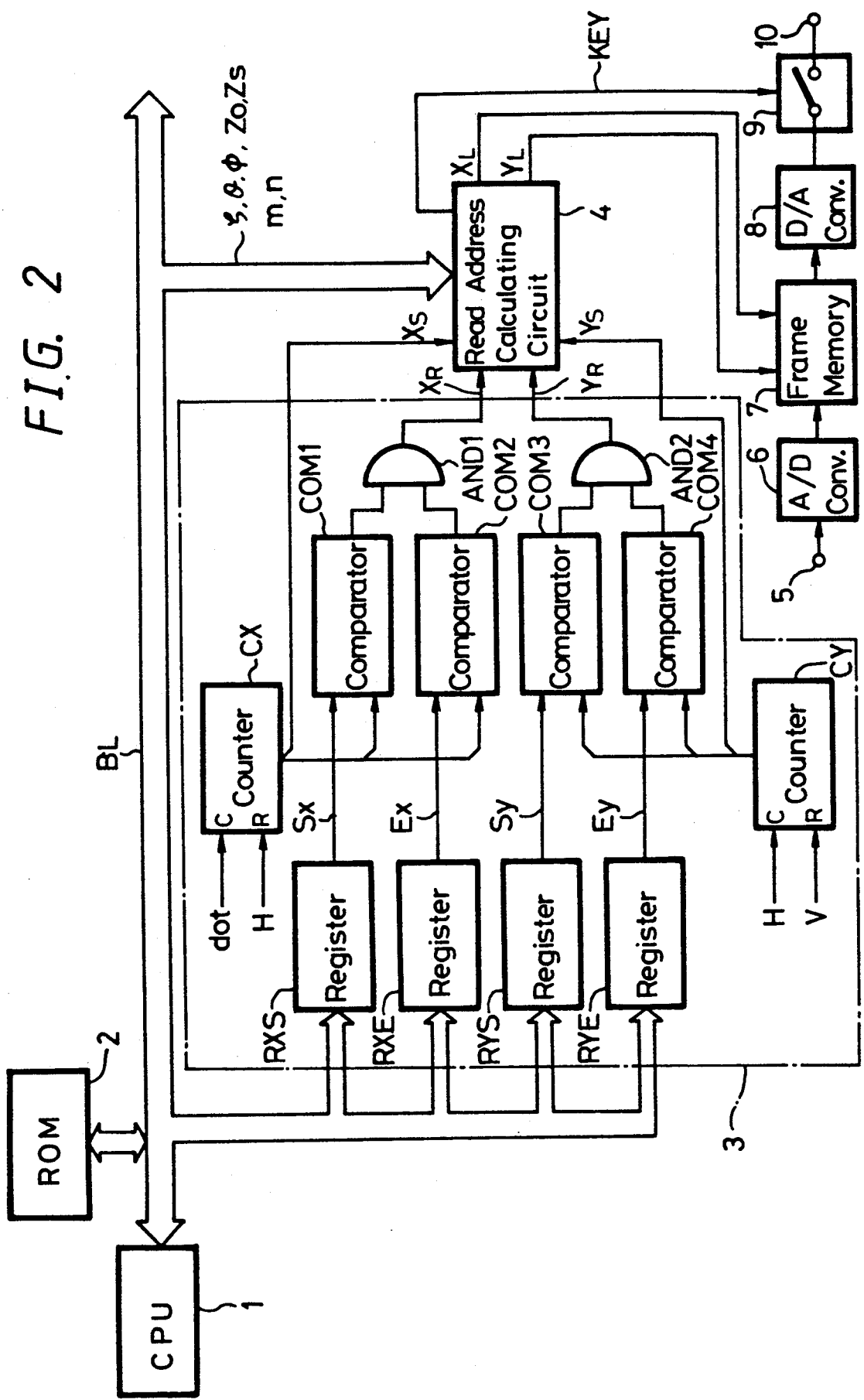
FIG. 2 is a circuit block diagram showing one embodiment of a special effect generator for video signals according to the present invention.

FIG. 2 shows a block diagram of this invention, in which there is shown a central processing unit (CPU) 1 that is coupled to a read only memory (ROM) 2 and other circuit elements, which will be described later, via a bus line BL. The ROM 2 has stored therein data that indicates the calculating region for each special effect pattern on the display screen.

Figure 1:
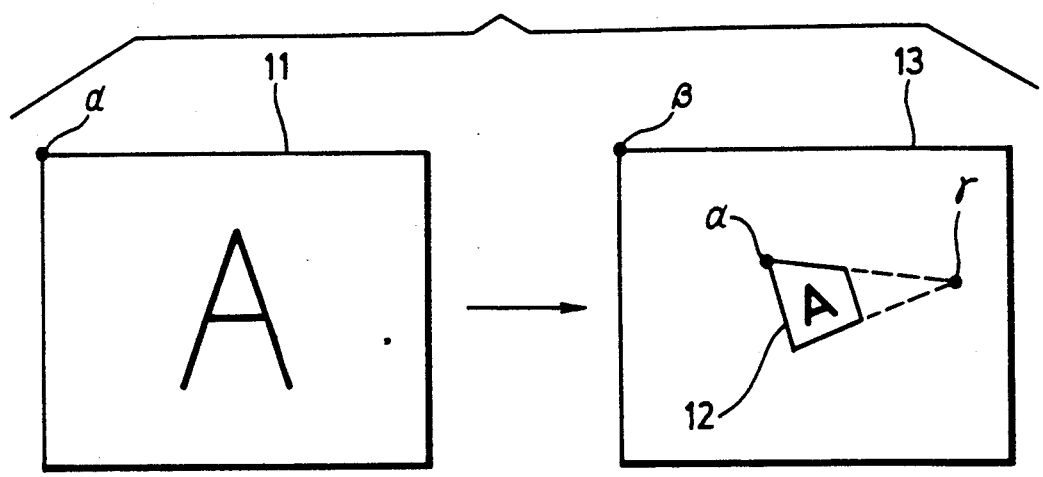
FIG. 1 is a schematic representations of an original video image and a rotation-processed video image, respectively, and to which reference will be made in explaining a previously proposed special effect generator for video signals.
Figure 3:
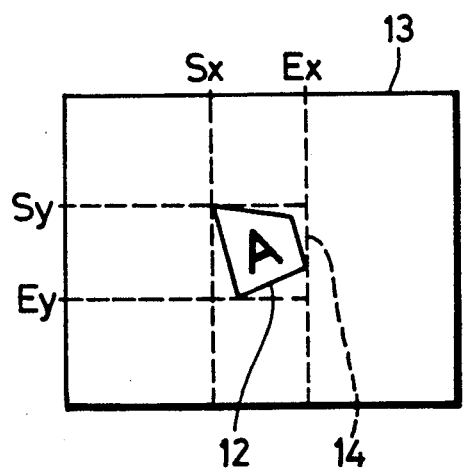
FIG. 3 is a schematic representation of a video image processed by the video special effect generator shown in FIG. 2, and to which reference will be made in explaining an operation of this video special effect generator.

More specifically, as shown in FIG. 3, the ROM 2 has stored therein a calculation region start address Sx in the lateral direction (x-axis direction) of the display screen 13, an end address Ex in the same direction, a calculation region start address Sy in the longitudinal direction (y-axis direction) of the display screen 13, and an end address Ey in the same direction to thereby specify a calculation region 14.

There is shown in FIG. 2 a calculation region control circuit 3 that includes registers RXS, RXE, RYS and RYE. The register RXS stores the calculation region start address Sx and the register RXE stores the end address Ex. The register RXS stores the start address Sy, and the register RYE stores the end address Ey.

As shown in FIG. 2, counters CX and CY are provided. The counter CX is reset by a horizontal synchronizing signal (H), and counts clock pulses (dot) that correspond to pixels along a horizontal scan line to continuously generate an address Xs in the x-axis direction of the display screen 13, whereas the counter CY is reset by a vertical synchronizing signal (V), and counts horizontal synchronizing signals (H) to continuously generate an address Ys in the y-axis direction of the display screen 13. Therefore, the counters CY and CX continuously count changing x-axis and y-axis addresses.

Comparators COM1 and COM2 are provided, which are both coupled to the counter CX, and the comparator COM1 compares the x-axis direction address Xs from the counter CX with the calculation region start address Sx from the register RXS. The comparator COM1 derives an output signal "1" when the address Xs from the counter CX is larger than the start address Sx. The comparator COM2 compares the x-axis direction address Xs from the counter CX with the end address Ex from the register RXE. When the address Xs from the counter CX is smaller than the end address Ex, the comparator COM2 derives an output signal "1".

Further, comparators COM3 and COM4 are provided, which are both connected to the counter CY. The comparator COM3 compares the y-axis direction address Ys from the counter CY with the start address Sy from the register RYS. When the address Ys from the counter CY is larger than the start address Sy, the comparator COM3 derives an output signal "1". The comparator COM4 compares the y-axis direction address Ys from the counter CY with the end address Ey from the register RYE. When the address Ys from the counter CY is smaller than the end address Ey, the comparator COM4 derives an output signal "1". AND circuits AND1 and AND2 are coupled to the comparators COM1, COM2 and COM3, COM4 respectively. The AND circuit AND1 is supplied at input terminals thereof with the signals from the comparators COM1 and COM2, whereas the AND circuit AND2 is supplied at input terminals thereof with the signals from the comparators COM3 and COM4.

The output signals from these AND circuits AND1 and AND2 are supplied to a read address calculating circuit 4 as addresses $X_R$ and $Y_R$ to limit the region of the calculating operation for the read address calculating circuit 4 so that the read address calculating circuit 4 is inhibited from performing useless calculations. Further, the output signal of the counter CX is supplied to the read address calculating circuit 4 as an address Xs and the output signal of the counter CY is also supplied thereto as an address Ys.

The read address calculating circuit 4 calculates read addresses $X_L$ and $Y_L$ to read the data from a frame memory 7 in a fixed decimal point calculation fashion. The read address calculating circuit 4 also generates a key signal KEY that indicates a border line in the processed video image 12.

Further in FIG. 2, there are provided an analog-to-digital (A/D) converting in circuit 6 and digital-to-analog (D/A) converting circuit 8.

An analog video signal of an original video image is applied to an input terminal 5 and is fed to the A/D converting circuit 6, in which it is converted to the form of a digital signal. The digital signal from the A/D converting circuit 6 is supplied to the frame memory 7. The frame memory 7 supplies the digital signal to the D/A converting circuit 8 in accordance with the address signals $X_L$ and $Y_L$ from the read address calculating circuit 4. The D/A converting circuit 8 is gated by a gate circuit 9 in response to the key signal (KEY) from the read address calculating circuit 4, and an output signal from the gate circuit 9 is fed to an output terminal 10.

The process of rotating the original video image will be described with reference to FIG. 4.

Figure 4:
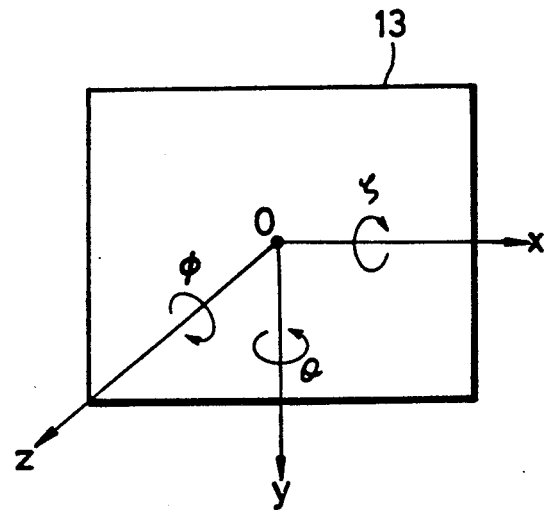
FIG. 4 is a schematic representation used in understanding the operation of the present invention.

As shown in FIG. 4, an x axis extends in the horizontal direction on the display screen 13, a y axis which extends in the vertical direction on the display screen 13, a z axis which extends in the direction perpendicular to the display screen 13, $\zeta$ is the rotational angle about the x axis, $\theta$ is the rotational angle about the y axis and $\phi$ is the rotational angle about the z axis. Further, Xs is the address in the x-axis direction on the display screen 13, Ys is the address in the y-axis direction on the display screen 13, and $X_L$ and $Y_L$ are the read addresses to the frame memory 7. Then, the read addresses $X_L$ and $Y_L$ are given by the following equations:

$$X_L = -\{(R_4 X_s - R_1 Y_s)Z_0\}m/\{R_2 X_s + R_5 Y_s + R_8(Z_s - Z_0)\} \quad (i)$$

$$Y_L = -\{(R_3 X_s - R_0 Y_s)Z_0\}n/\{R_2 Y_s + R_5 Y_s + R_8(Z_s - Z_0)\} \quad (ii)$$

where $Z_0$ and $Z_s$ are constants and m and n are coefficients used to enlarge or shrink the original video image. Further, in the above-described equations (i) and (ii), $R_0$ to $R_8$ are constants depending on the rotational angles $\zeta$, $\theta$ and $\phi$ and the order of the rotations around the rotational axes. If the video image is rotated in the order of, for example, about the x axis, about the y axis and about the z axis, the constants $R_0$ to $R_8$ are expressed by the following equation:

$$\begin{bmatrix} R_0, & R_3, & R_6, \\ R_1, & R_4, & R_7, \\ R_2, & R_5, & R_8, \end{bmatrix} = \begin{bmatrix} \cos\theta\cos\phi, & \cos\theta\sin\phi, & -\sin\phi \\ \sin\zeta\sin\theta\cos\phi - \cos\zeta\sin\phi, & \sin\zeta\sin\theta\sin\phi + \cos\zeta\cos\phi, & \sin\zeta\cos\theta \\ \cos\zeta\sin\theta\cos\phi + \sin\zeta\sin\phi, & \cos\zeta\sin\theta\sin\phi - \sin\zeta\cos\phi, & \cos\zeta\cos\theta \end{bmatrix} \quad (iii)$$

The above-mentioned equations (i) to (iii) are executed by the read address calculating circuit 4. For example, the rad address calculating circuit 4 calculates the constants $R_0$ to $R_8$ by means of the equation (iii) in accordance with the angle information $\zeta$, $\theta$ and $\phi$ from the CPU 1. The constants $R_0$ to $R_8$ thus obtained, and constants $Z_0$, $Z_s$, m and n are substituted into the equations (i) and (ii), and then the read addresses $X_L$ and $Y_L$ are calculated by the read address calculating circuit 4. Thereafter, the data at the addresses $X_L$ and $Y_L$ is supplied to the frame memory 7. Then the data at the addresses $X_L$ and $Y_L$ is supplied from the frame memory 7 to the D/A converting circuit 8, thereby converting into an analog signal an image of a rotation-processed video signal. Thus, the processed video image 12 shown in FIG. 3 is displayed on the display screen 13.

As described above, since the calculation for processing the original video image in a special effect fashion is limited to the calculation region 14 within which the processed video image 12 is displayed on the display screen 13, the dynamic range of the coordinates system on which the calculation is made is small, and the number of figures necessary for the calculation is small. Therefore, the circuits for the calculation are simple in arrangement and are inexpensive, thus making it possible to realize an inexpensive special effect generator having multiple functions.

While data showing the calculation region 14 of each special effect pattern is stored in the ROM 2 as described above, data for each calculating region 14 need not be stored in advance but may be calculated by the CPU 1 for each special effect pattern that is desired.

The calculations for the calculating region 14 can be performed either by software or hardware. Furthermore, the calculation for obtaining the addresses $X_L$ and $Y_L$ may be performed in a fixed or a floating decimal point calculation fashion.

Having described a preferred embodiment of the invention with reference to the accompanying drawings, it will be apparent that the invention is not limited to that precise embodiment and that various changes and modifications could be effected by one skilled in the art without departing from the spirit or scope of the novel concepts of the invention as determined in the appended claims.

We claim as our invention:

1. A special effect generator for video signals comprising:
   memory means for storing video signals representing an image;
   a source of data indicating by x and y addresses a calculating region having coordinate boundaries for a special effect pattern that is smaller than the image;
   read address generating means coupled to said memory means and said source of data for generating a read address for addressing said video signals stored in said memory means associated with the special effect pattern; and
   address generation control means coupled to said source of data and to said read address generating means for limiting the generation of said read address in x and y directions based on said coordinate boundaries in response to the data indicating the calculating region from said source, so that only those read addresses actually required for the special effect are calculated.

2. The special effect generator according to claim 1, wherein said address generation control means receives the data indicating the calculating region for the special effect pattern from said source of data and includes x address limiting means for producing an x address limiting signal fed to said read address generating means for limiting addresses in the x direction to the calculating region and y address limiting means for producing a y address limiting signal fed to said read address generating means for limiting addresses in the y direction to the calculating region.

3. The special effect generator according to claim 2, wherein said x address limiting means includes a first register for setting an x start address, a second register for setting an x end address, a first comparator being supplied with said x start address stored in said first register, a second comparator being supplied with said x end address set in said second register, a first counter receiving synch signals of said video signals and for supplying an x display address to said first and second comparators, said first comparator comparing said x start address to said x display address and generating a signal when said x display address is larger than said x start address and said second comparator comparing said x end address to said x display address and generating a signal when said x display address is smaller than said end address, while said y address limiting means includes a third register for setting a y start address, a fourth register for setting a y end address, a third comparator being supplied with said y start address set in said third register, a fourth comparator being supplied with said y end address set in said fourth register, and a second counter receiving synch signals of said video signals and for supplying a y display address to said third and fourth comparators, said third comparator comparing said y start address to said y display address and generating a signal when said y display address is larger than said y start address and said second comparator comparing said y end address to said y display address and generating a signal when said y display address is smaller than said end address.

4. The special effect generator according to claim 3, wherein said x address limiting means further includes a first AND gate coupled to said first and second comparators for generating said x address limiting signal to be supplied to said read address generating means, and said y address limiting means further includes a second AND gate coupled to said third and fourth comparators for generating said y address limiting signal to be supplied to said read address generating means.

5. The special effect generator according to claim 4, wherein said x display address from said first counter and said y display address from said second counter are also supplied to said read address generating means.

* * * * *